United States Patent
Sriram et al.

(10) Patent No.: US 12,463,865 B2
(45) Date of Patent: Nov. 4, 2025

(54) AUTOMATIC RE-PROVISIONING OF DYNAMICALLY PROVISIONED DIFFERENTIATED FEATURES IN A CUSTOMER PREMISES EQUIPMENT (CPE)

(71) Applicant: Charter Communications Operating, LLC, St. Louis, MO (US)

(72) Inventors: Ajay G. Sriram, Lone Tree, CO (US); Jay T. Liew, Parker, CO (US); Louis J. Hendrich, Highlands Ranch, CO (US); Stephen Gionfriddo, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 398 days.

(21) Appl. No.: 17/973,103

(22) Filed: Oct. 25, 2022

(65) Prior Publication Data
US 2024/0137271 A1  Apr. 25, 2024
US 2024/0235933 A9  Jul. 11, 2024

(51) Int. Cl.
*H04L 41/08* (2022.01)
*H04L 12/28* (2006.01)
*H04L 41/0813* (2022.01)
*H04L 41/0869* (2022.01)

(52) U.S. Cl.
CPC ...... *H04L 41/0813* (2013.01); *H04L 12/2801* (2013.01); *H04L 41/0869* (2013.01); *H04L 41/0886* (2013.01)

(58) Field of Classification Search
CPC ............ H04L 41/0813; H04L 41/0869; H04L 41/0886; H04L 12/2801; H04L 12/2898; H04L 12/2874; H04L 12/2858
USPC .......................................... 375/222; 709/224
See application file for complete search history.

(56) References Cited

U.S. PATENT DOCUMENTS 12,009,942 B2 *  6/2024  Sriram ................ H04L 12/2898
2018/0219958 A1 *  8/2018  Bernstein ............ H04L 41/0895

* cited by examiner

*Primary Examiner* — Kevin M Burd
(74) *Attorney, Agent, or Firm* — Dority & Manning, P.A.

(57) ABSTRACT

It is determined that a customer premises equipment (CPE) that provides data access to a local area network has been dynamically provisioned with a differentiated feature that is different from default features identified in a boot configuration from which the CPE obtains features during a boot phase of the CPE. A first CPE identifier of the CPE is determined and stored in a memory. Subsequent to storing the first CPE identifier in the memory, information that contains a second CPE identifier and that indicates that a CPE identified by the second CPE identifier has initiated a boot phase is received. It is determined that the second CPE identifier matches the first CPE identifier. Subsequent to the CPE initiating the boot phase, the CPE is caused to be dynamically provisioned with the differentiated feature.

20 Claims, 6 Drawing Sheets

AUTOMATIC RE-PROVISIONING OF DYNAMICALLY PROVISIONED DIFFERENTIATED FEATURES IN A CUSTOMER PREMISES EQUIPMENT (CPE)

BACKGROUND

A subscriber that obtains network access from a service provider chooses a particular service tier that defines certain features, such as, for example, quality of service (QoS) features such as bandwidth. A customer premises equipment (CPE), such as a cable modem or Optical Network Unit (ONU), enforces the features associated with a particular subscriber. At times, in response to certain events, a CPE may be dynamically provisioned with a different feature than that identified in a default boot configuration for the subscriber.

SUMMARY

The embodiments disclosed herein implement automatic re-provisioning of differentiated features.

In one embodiment a method is provided. The method includes determining, by a computing system comprising one or more computing devices, that a customer premises equipment (CPE) that provides data access to a local area network has been dynamically provisioned with a differentiated feature that is different from default features identified in a boot configuration from which the CPE obtains features during a boot phase of the CPE. The method further includes determining a first CPE identifier of the CPE. The method further includes storing, by the computing system, the first CPE identifier in a memory. The method further includes, subsequent to storing the first CPE identifier in the memory, receiving, by the computing system, information that contains a second CPE identifier and that indicates that a CPE identified by the second CPE identifier has initiated a boot phase. The method further includes determining that the second CPE identifier matches the first CPE identifier. The method further includes, subsequent to the CPE initiating the boot phase, causing, by the computing system, the CPE to be dynamically provisioned with the differentiated feature.

In another embodiment a computing system is provided. The computing system includes one or more computing devices configured to determine that a customer premises equipment (CPE) that provides data access to a local area network has been dynamically provisioned with a differentiated feature that is different from default features identified in a boot configuration from which the CPE obtains features during a boot phase of the CPE. The one or more computing devices are further configured to determine a first CPE identifier of the CPE. The one or more computing devices are further configured to store the first CPE identifier in a memory. The one or more computing devices are further configured to, subsequent to storing the first CPE identifier in the memory, receive information that contains a second CPE identifier and that indicates that a CPE identified by the second CPE identifier has initiated a boot phase. The one or more computing devices are further configured to determine that the second CPE identifier matches the first CPE identifier. The one or more computing devices are further configured to, subsequent to the CPE initiating the boot phase, cause, by the computing system, the CPE to be dynamically provisioned with the differentiated feature.

In another embodiment a non-transitory computer-readable storage medium is provided. The non-transitory computer-readable storage medium includes executable instructions to cause one or more processor devices to determine that a customer premises equipment (CPE) that provides data access to a local area network has been dynamically provisioned with a differentiated feature that is different from default features identified in a boot configuration from which the CPE obtains features during a boot phase of the CPE. The instructions further cause the one or more processor devices to determine a first CPE identifier of the CPE. The instructions further cause the one or more processor devices to store the first CPE identifier in a memory. The instructions further cause the one or more processor devices to subsequent to storing the first CPE identifier in the memory, receive information that contains a second CPE identifier and that indicates that a CPE identified by the second CPE identifier has initiated a boot phase. The instructions further cause the one or more processor devices to determine that the second CPE identifier matches the first CPE identifier. The instructions further cause the one or more processor devices to, subsequent to the CPE initiating the boot phase, cause, by the computing system, the CPE to be dynamically provisioned with the differentiated feature.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
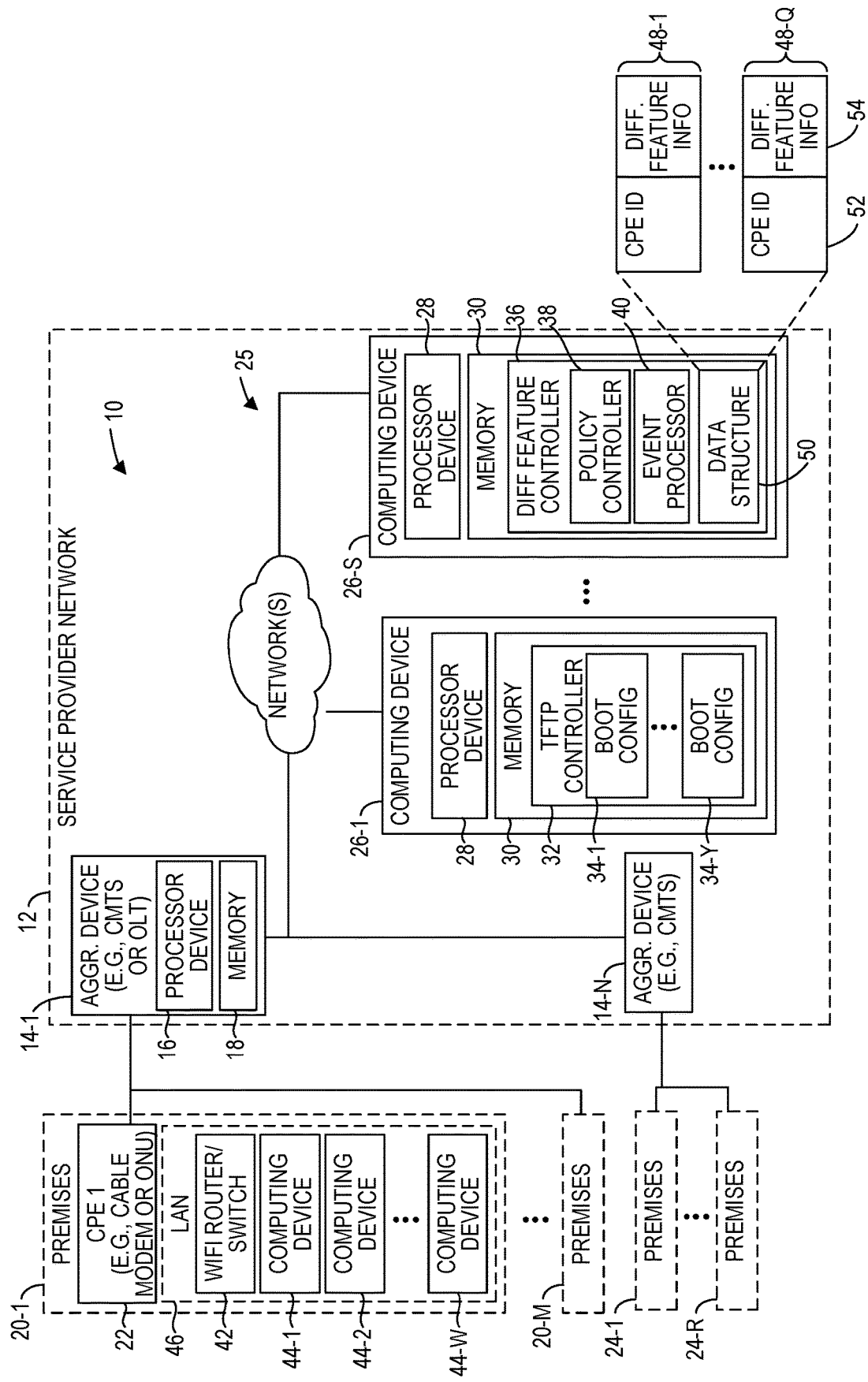
FIG. 1 is a block diagram of an environment in which automatic re-provisioning of dynamically provisioned differentiated features in a CPE may be practiced according to some embodiments.

The embodiments set forth below represent the information to enable individuals to practice the embodiments and illustrate the best mode of practicing the embodiments. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A subscriber that obtains network access from a service provider chooses a particular service tier that defines certain features, such as, for example, quality of service (QoS) features such as bandwidth. A customer premises equipment (CPE), such as a cable modem or Optical Network Unit, implements the features associated with a particular subscriber. At times, in response to certain events, a CPE may be dynamically provisioned with a different feature than that identified in a default configuration of the CPE. Such dynamically provisioned features are typically provisioned for a temporary timeframe. Examples of such dynamically provisioned features include a bandwidth feature, a device priority feature, and a traffic type priority feature. Such features may be used, for example, to implement increased bandwidth, higher priority for traffic flows associated with a particular device, higher priority for a particular type of traffic type, or the like.

If the CPE is turned off, or torn down by an upstream device, such as a cable modem termination system (CMTS) or an Optical Line Terminal (OLT), the CPE loses its current configuration. When the CPE is reinitialized, the CPE initiates a boot phase and obtains a default boot configuration associated with the CPE. Typically the CPE obtains the default boot configuration from a computing device in the service provider's network and reapplies the default features identified in the default boot configuration, resulting in any dynamically provisioned features being lost. If the dynamically provisioned feature was a feature that benefited a subscriber, such as a temporary higher bandwidth, this may lead to subscriber dissatisfaction if the conditions under which the subscriber was to receive the higher bandwidth still exists.

The embodiments disclosed herein implement automatic re-provisioning of differentiated features. The embodiments determine that a CPE has been provisioned with a differentiated feature that differs from features identified in a boot configuration from which the CPE obtains features during a boot phase of the CPE. When the CPE has booted and, if the conditions under which the differentiated feature was provided to the CPE still exist, automatically, without human intervention, the CPE is caused to be dynamically provisioned with the differentiated feature that was lost during the boot phase.

FIG. 1 is a block diagram of an environment 10 in which automatic re-provisioning of dynamically provisioned differentiated features in a CPE may be practiced according to some embodiments. The environment 10 includes a service provider network 12 that includes a plurality of aggregation devices 14-1-14-N. The aggregation device 14-1 includes a processor device 16 and a memory 18, and provides services, such as, by way of non-limiting example, Internet access and/or voice services, to a plurality of premises 20-1-20-M.

The aggregation device 14-1 communicates with a customer premises equipment (CPE) 22 in the premises 20-1 via, for example, a coaxial cable or a fiber cable. The CPE 22 may comprise, for example, a cable modem or a fiber modem. The aggregation device 14 may comprise, for example, a cable modem termination system (CMTS) or a fiber aggregation system such as an Optical Line Terminal (OLT). For purposes of illustration only one CPE 22 is shown, however, in practice, the aggregation device 14-1 communicates with a CPE 22 located in each of the premises 20-1-20-M, and thus may be coupled to tens, hundreds or thousands of CPEs 22. The aggregation device 14-N similarly communicates with CPEs 22 located in premises 24-1-24-R.

The aggregation device 14-1 communicates with a computing system that includes one or more computing devices 26-1-26-S in the service provider network 12, each of which includes a processor device 28 and a memory 30. The computing device 26-1 includes a TFTP controller 32 that maintains a plurality of boot configurations 34-1-34-Y, each of which may correspond to a particular CPE. In this example, the boot configuration 34-1 corresponds to the CPE 22 in the premises 20-1 and is provided by the TFTP controller 32 to the CPE 22 when the CPE 22 initiates a boot phase. The boot configuration 34-1 contains default features, including default QoS features, that the CPE 22 loads during the boot phase. Such default features may include, by way of non-limiting example, upload and download bandwidths that the CPE 22 is to provide. The CPE 22 may initiate the boot phase when powering on, in response to a signal from another device, such as the aggregation device 14-1, or in response to a user in the premises 20-1 physically contacting a reset actuation button on the CPE 22.

The computing device 26-S includes a differentiated feature controller 36 that operates to implement automatic re-provisioning of differentiated features as will be described herein. The differentiated feature controller 36 includes a policy controller 38 and an event processor 40.

The CPE 22 may be communicatively coupled to a router 42. The router 42 is connected to a plurality of computing devices 44-1-44-W and implements a local area network 46 in the premises 20-1.

The policy controller 38 may determine that the CPE 22 is to be dynamically provisioned with a differentiated feature. This determination may be made, by way of non-limiting example, in response to a user request, in response to an operator request, in response to an occurrence of an event, such as a detection of a certain type of traffic being sent or received by the CPE 22, in response to the connection of a particular computing device 44 to the router 42, or in response to any other suitable condition, criteria or event.

The term "differentiated feature" refers to a feature that was dynamically provisioned. The term "dynamically provisioned", as used herein, refers to modifying a feature of the CPE 22 without causing or requiring a reboot of the CPE 22. In particular, the CPE 22 may be dynamically provisioned with a feature via suitable instructions sent to the CPE 22 by the aggregation device 14-1. The particular instructions may differ depending on the manufacturer and/or model of the aggregation device 14-1 and the CPE 22. The term "feature" as used herein refers to parameters of the CPE 22 that cause the CPE 22 to process one or more packet flows in a particular manner, such as providing one or more packet flows with a particular bandwidth, providing a packet flow associated with a particular computing device 44 a higher or lower priority than packet flows associated with other computing devices 44, providing packet flows associated with a particular traffic type, such as a gaming traffic type, a higher priority than other packet flows, providing all packet flows a higher bandwidth than a default bandwidth, and the like. As another example, the CPE 22 may be dynamically provisioned with a differentiated QoS feature to provide the computing device 44-1 a higher bandwidth than a default bandwidth of the CPE 22 due to a particular attribute of the computing device 44-1.

In response determining that the CPE 22 is to be dynamically provisioned with a differentiated feature, the policy controller 38 may send an instruction to the aggregation device 14-1 instructing the aggregation device 14-1 to send instructions to the CPE 22 to process one or more packet flows differently from how such packet flows would otherwise be processed in accordance with a boot configuration of the CPE 22. As an example, the policy controller 38 may send an instruction to the aggregation device 14-1 indicating that packet flows associated with the computing device 44-1 are to be provided a greater bandwidth than a default bandwidth of the CPE 22. As another example, the policy controller 38 may send an instruction to the aggregation device 14-1 indicating that network traffic (i.e., a packet flow) sent by or received by the computing device 44-W is to have a higher priority than other network traffic on the local area network (LAN) 46.

The policy controller 38 may also send a message to the event processor 40 that indicates that the CPE 22 has been dynamically provisioned with a differentiated feature. In response, the event processor 40 generates an entry 48-Q in a data structure 50 that contains a plurality of entries 48-1-48-Q, each of which corresponds to a differentiated feature that has been dynamically provisioned on a CPE. The entry 48-Q includes, for example, a CPE identifier 52 of the CPE 22, such as a media access control (MAC) address or internet protocol (IP) address of the CPE 22 or any other suitable identifier, and differentiated feature information 54 that contains information suitable for dynamically re-provisioning the CPE 22 with the differentiated feature, such as a particular feature parameter, a feature value, and/or any other suitable information.

The differentiated feature may be temporary and end upon the occurrence of some event, such as a timer expiring, the computing device 44 leaving the LAN 46, or upon the occurrence of any other suitable event. Upon the occurrence of such event, the policy controller 38 may send instructions to the aggregation device 14-1 that instructs the aggregation device 14-1 to remove the differentiated feature from the CPE 22. The policy controller 38 may also send a message to the event processor 40 indicating that the CPE 22 is no longer provisioned with the differentiated feature. The event processor 40 may then delete the entry 48-Q from the data structure 50.

The event processor 40 continuously receives event notifications associated with the service provider network 12. In some embodiments, such event notifications may be generated via a telemetry package that is installed on the various aggregation devices 14-1-14-N, CPEs 22, and any other devices from which notifications of events are desirable. The events may include events that occur in conjunction with the CPE 22 initiating a boot phase of the CPE 22 wherein the CPE 22 requests the boot configuration 34-1 from the TFTP controller 32. Such events may include a modem registration event that is generated in conjunction with the CPE 22 initiating the boot phase. The events may include identifiers that identify the CPE 22. Upon receipt of an event that indicates the CPE 22 initiated the boot phase, the event processor 40 searches the data structure 50 to determine if the CPE 22 had been dynamically provisioned with a differentiated feature since any such differentiated features would be lost subsequent to the boot phase of the CPE 22. The event processor then causes the CPE 22 to be dynamically re-provisioned with the differentiated feature. In particular, in one embodiment, the event processor 40 sends a message to the policy controller 38 indicating that the CPE 22 should be dynamically re-provisioned with the differentiated feature with which the CPE 22 was previously dynamically provisioned prior to the rebooting of the CPE 22.

In response, the policy controller 38 may send an instruction to the aggregation device 14-1 instructing the aggregation device 14-1 to send instructions to the CPE 22 to dynamically provision the CPE 22 with the differentiated feature. The aggregation device 14-1 receives the instruction and sends instructions to the CPE 22 suitable to dynamically provision the CPE 22 with the differentiated feature.

It is noted that because the differentiated feature controller 36 is a component of the computing device 26-S, functionality implemented by the differentiated feature controller 36 may be attributed to the computing device 26-S generally. Moreover, in examples where the differentiated feature controller 36 comprises software instructions that program the processor device 28 to carry out functionality discussed herein, functionality implemented by the differentiated feature controller 36 may be attributed herein to the processor device 28.

It is further noted that while the differentiated feature controller 36 is illustrated as having two components, the policy controller 38 and the event processor 40, in other embodiments, the differentiated feature controller 36 may be implemented in a single component or could be implemented in a greater number of components than two, and such components may be implemented on the same or separate computing devices 26.

Figure 2:
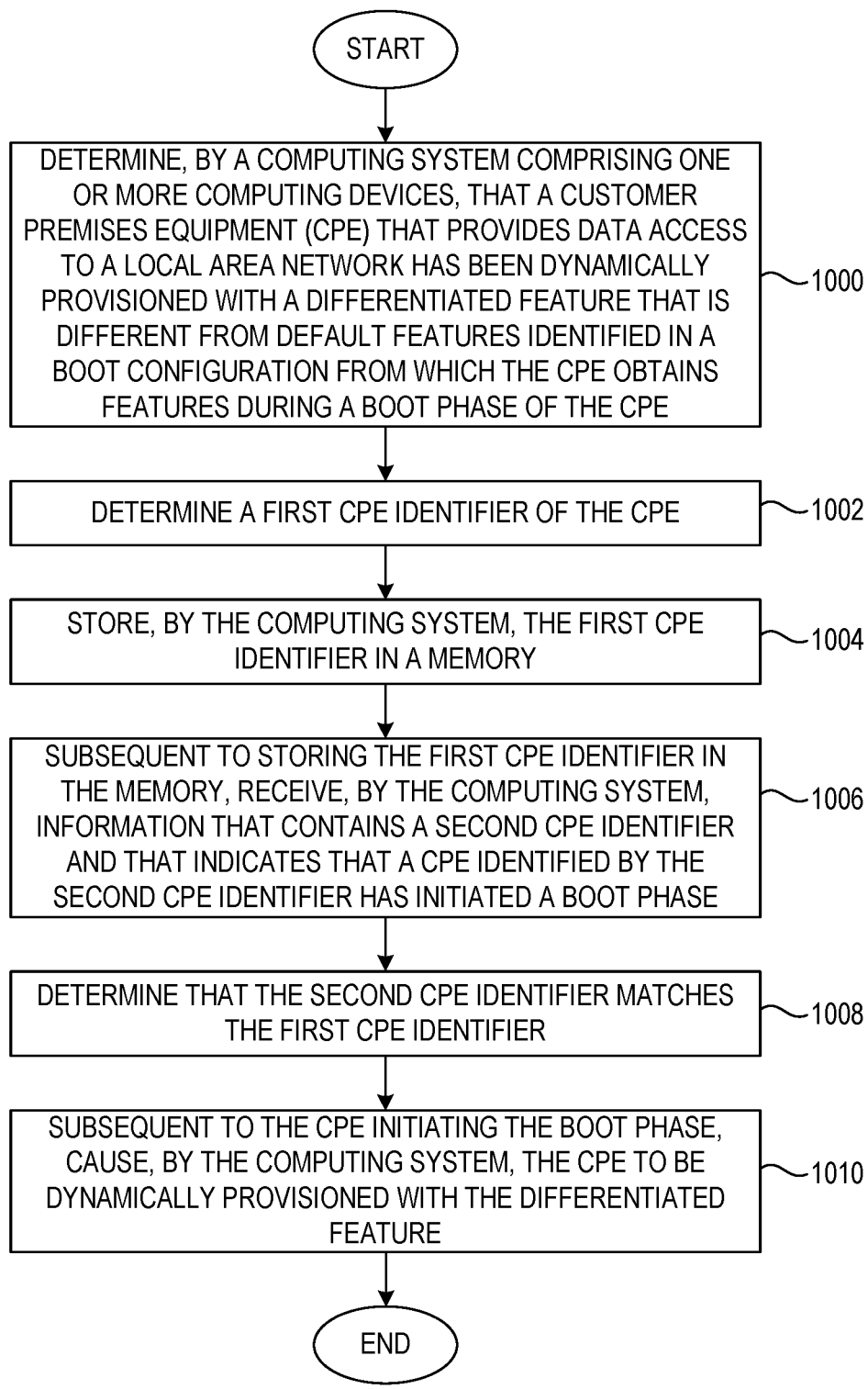
FIG. 2 is a flowchart of a method for automatic re-provisioning of dynamically provisioned differentiated features in a CPE according to some embodiments.

FIG. 2 is a flowchart of a method for automatic re-provisioning of dynamically provisioned differentiated features in a CPE according to some embodiments. FIG. 2 will be discussed in conjunction with FIG. 1. The computing system 25, comprising the one or more computing devices 26-1-26-S, determines that the CPE 22 that provides data access to the local area network 46 has been dynamically provisioned with a differentiated feature that is different from default features identified in the boot configuration 34-1 from which the CPE 22 obtains features during a boot phase of the CPE 22 (FIG. 2, block 1000). The computing system 25 determines the first CPE identifier 52 of the CPE 22 (FIG. 2, block 1002). The computing system 25 stores the first CPE identifier 52 in the memory 30 (FIG. 2, block 1004). The computing system 25, subsequent to storing the first CPE identifier 52 in the memory 30, receives information that contains a second CPE identifier and that indicates that a CPE identified by the second CPE identifier has initiated a boot phase (FIG. 2, block 1006). The computing system 25 determines that the second CPE identifier matches the first CPE identifier 52 (FIG. 2, block 1008). The computing system 25, subsequent to the CPE initiating the boot phase, causes the CPE 22 to be dynamically provisioned with the differentiated feature (FIG. 2, block 1010).

Figure 3A:
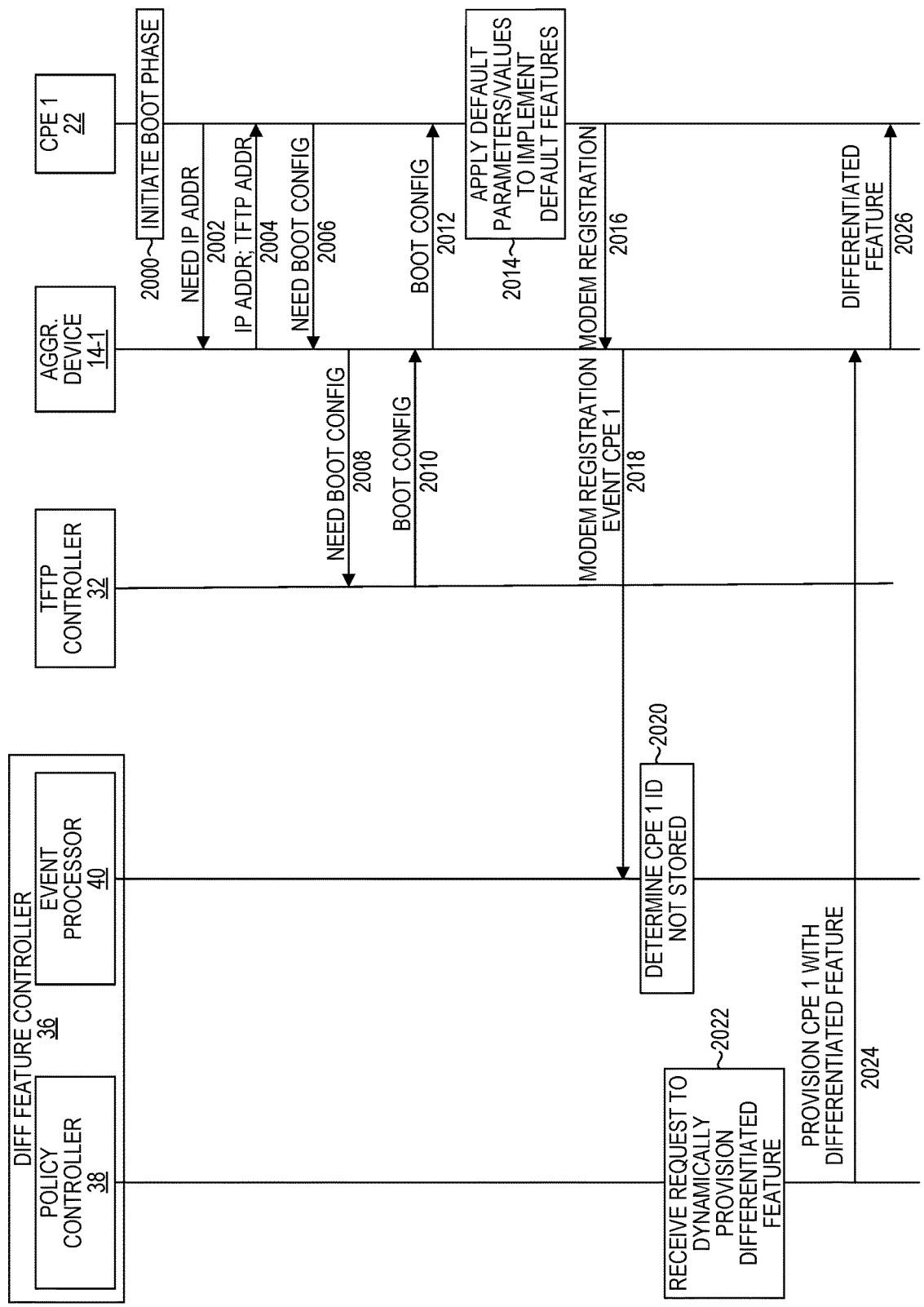
FIGS. 3A-3C are sequence diagrams that illustrate messages communicated between and actions taken by various components illustrated in FIG. 1 to implement automatic re-provisioning of dynamically provisioned differentiated features in a CPE according to some embodiments.
Figure 3B:
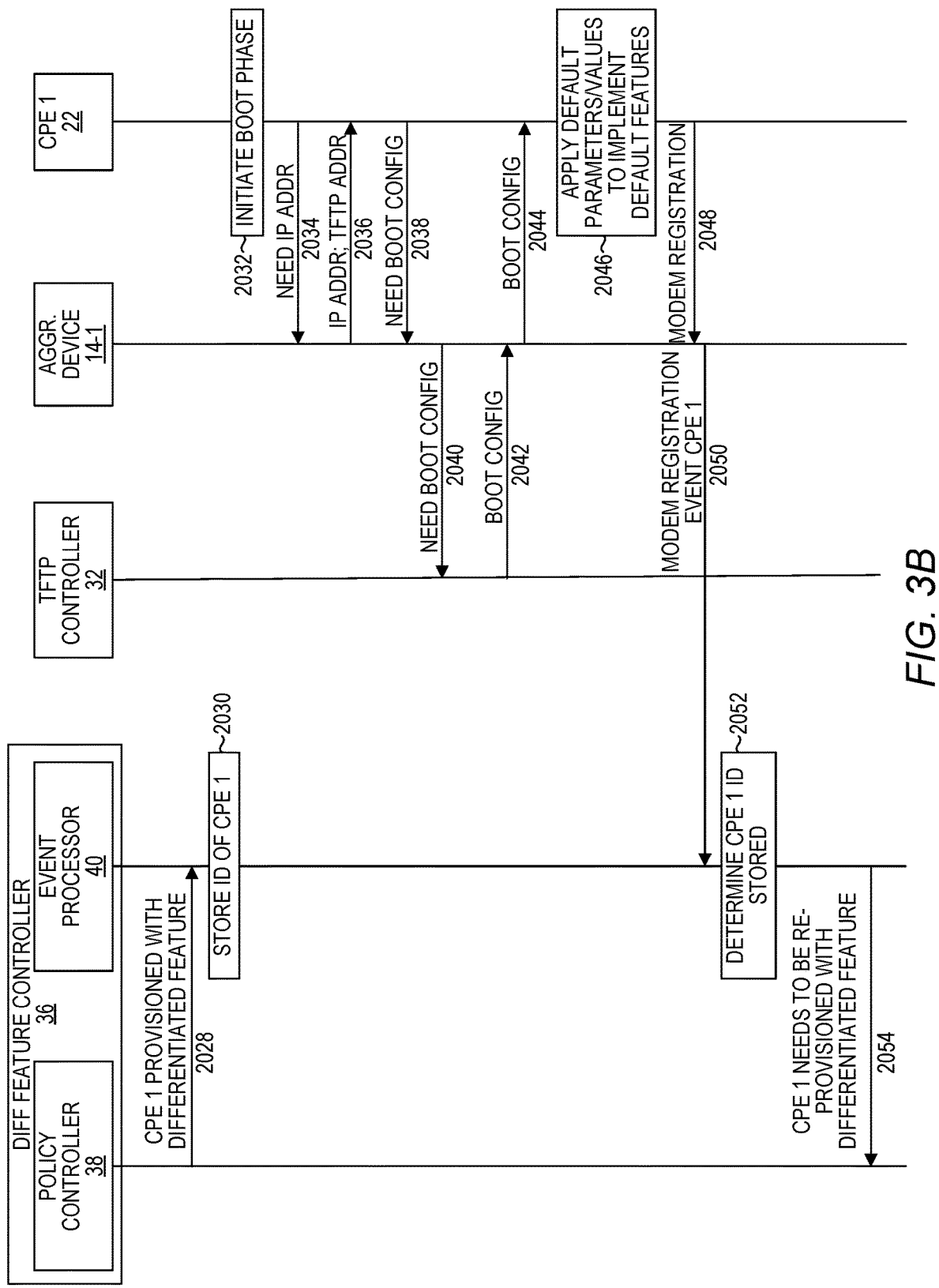
Figure 3C:
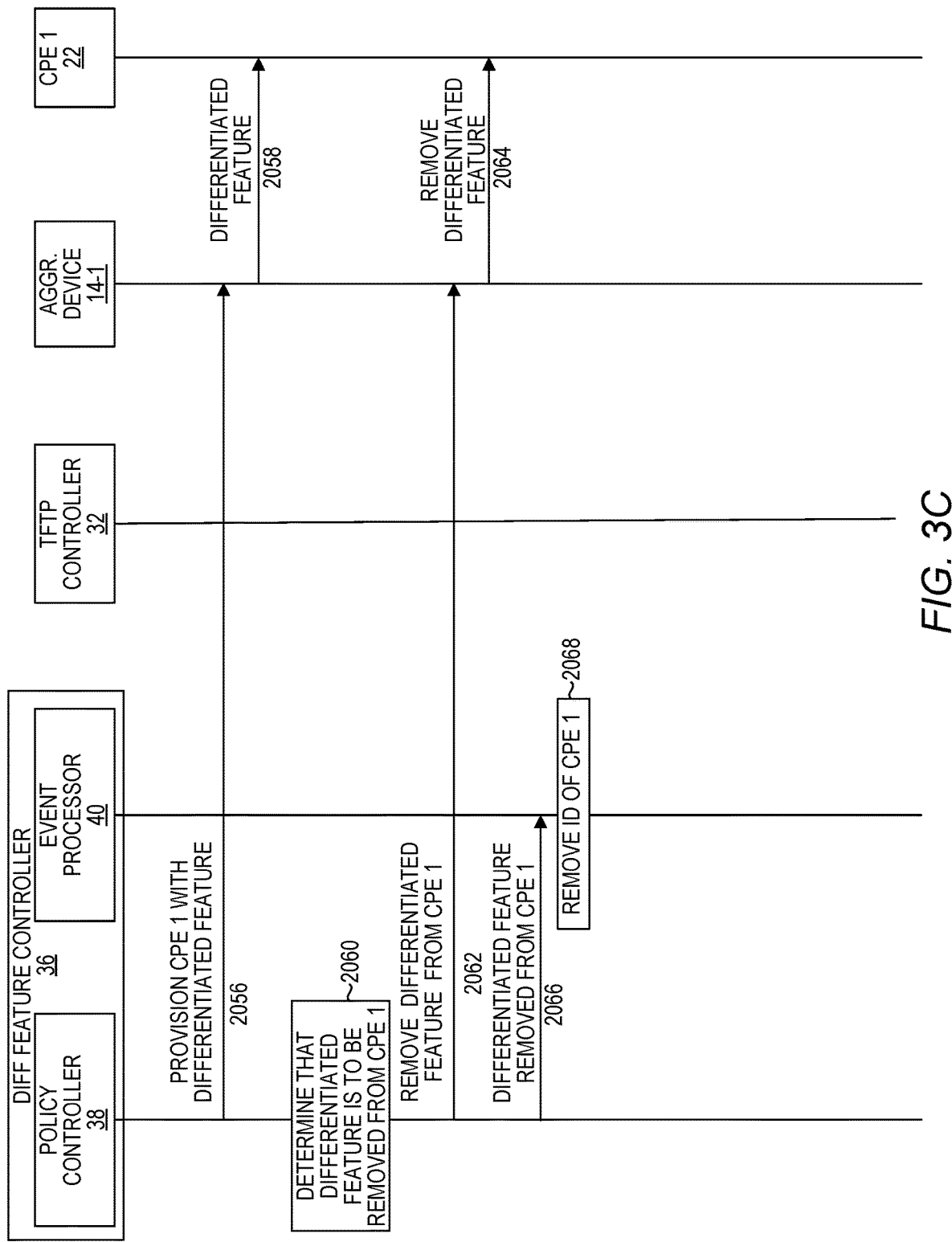

FIGS. 3A-3C are sequence diagrams that illustrate messages communicated between and actions taken by various components illustrated in FIG. 1 to implement automatic re-provisioning of dynamically provisioned differentiated features in a CPE according to some embodiments. Referring first to FIG. 3A, the CPE 22, in this example a cable modem, initiates a boot sequence (step 2000). The CPE 22 may initiate the boot sequence in response to being powered on, in response to a signal from an upstream device, such as the aggregation device 14-1, or in response to a request that the CPE 22 restart or otherwise reset itself. The CPE 22 sends a message to the aggregation device 14-1, which in this example is a CMTS, for an IP address (step 2002). The aggregation device 14-1 may obtain an IP address from, for example, a DHCP server, and sends the IP address and an address of the TFTP controller 32 to the CPE 22 (step 2004). The CPE 22 sends a request to the TFTP controller 32, via the aggregation device 14-1, for the boot configuration that corresponds to the CPE 22 (steps 2006, 2008). The TFTP controller 32 sends the boot configuration 34-1 to the CPE 22 via the aggregation device 14-1 (steps 2010, 2012). The CPE 22 loads the default parameters and values from the boot configuration 34-1 to implement the default features of the CPE 22 (step 2014).

The CPE 22 then registers with the aggregation device 14-1 (step 2016). The registration of the CPE 22 causes a modem registration event to be communicated to the event processor 40 (step 2018). The modem registration event includes an identifier of the CPE 22, such as a MAC or IP address of the CPE 22. The event processor 40 accesses the memory 30 and determines that the identifier of the CPE 22 has not been stored in the memory 30 (step 2020), and thus that the CPE 22 need not be re-provisioned with any differentiated features.

The policy controller 38 subsequently determines that the CPE 22 should be dynamically provisioned with a differentiated feature (step 2022). This determination may be made in response to a request from an operator front-end application or a subscriber front-end application. In some implementations, the policy controller 38 may receive a request from another process that has programmatically determined that the CPE 22 should be provisioned with a differentiated feature based on some event associated with the LAN 46, such as a determination that a particular computing device 44 has joined the LAN 46, or a particular type of traffic flow, such as a voice or gaming traffic flow, has been initiated by a computing device 44 on the LAN 46. The differentiated feature may apply to the entire LAN 46, selected computing device(s) 44, or, particular traffic flows on the LAN 46 (e.g., traffic between a particular computing device 44 and another computing device that is either on the LAN 46 or external to the LAN 46).

The policy controller 38 sends instructions to the aggregation device 14-1 to implement the requested differentiated feature (step 2024). The aggregation device 14-1 sends instructions to the CPE 22 to dynamically provision the CPE 22 (i.e., implement the feature without requiring a reboot) with the differentiated feature (step 2026). Referring now to FIG. 3B, the policy controller 38 sends an event notification to the event processor 40 indicating that the CPE 22 has been provisioned with a differentiated feature (step 2028). The event notification identifies the CPE 22, such as via a MAC or IP address, and may include differentiated feature information necessary to re-provision the CPE 22. The CPE 22 stores the identifier of the CPE 22 and, if present, any differentiated feature information (step 2030). Subsequently, the CPE 22 initiates the boot phase (step 2032). Again, this may occur for any number of reasons, including, by way of non-limiting example, in response to being powered on, in response to a signal from an upstream device, such as the aggregation device 14-1, or in response to a request that the CPE 22 restart or otherwise reset itself. The steps 2034-2046 are identical to the steps 2002-2014 discussed above and will not be discussed in detail again for the sake of brevity.

The application of the default parameters and values that implement the default features of the CPE 22 overrides the differentiated feature with which the CPE 22 was previously dynamically provisioned. The CPE 22 then registers with the aggregation device 14-1 (step 2048). The registration of the CPE 22 causes a modem registration event to be communicated to the event processor 40 (step 2050). The modem registration event includes an identifier of the CPE 22, such as a MAC or IP address of the CPE 22. The event processor 40 accesses the memory 30 and determines that the identifier of the CPE 22 is stored in the memory 30 and thus that the CPE 22 need be re-provisioned with the differentiated feature (step 2052).

The event processor 40 sends a message to the policy controller 38 indicating that the CPE 22 need be re-provisioned with the differentiated feature (step 2054). The message may include the differentiated provisioning information necessary for dynamically re-provisioning the CPE 22 with the differentiated feature. Referring now to FIG. 3C, the policy controller 38 sends instructions to the aggregation device 14-1 to implement the requested differentiated feature (step 2056). The aggregation device 14-1 sends instructions to the CPE 22 to dynamically provision the CPE 22 (i.e., implement the feature without requiring a reboot) with the differentiated feature (step 2058).

Subsequently, the policy controller 38 determines that a condition has occurred and the differentiated feature should be removed from the CPE 22 (step 2060). The policy controller 38 sends instructions to the aggregation device 14-1 to remove the differentiated feature form the CPE 22 (step 2062). The aggregation device 14-1 sends instructions to the CPE 22 to remove the differentiated feature (step 2064). The policy controller 38 sends an event notification to the event processor 40 indicating that the CPE 22 is no longer provisioned with a differentiated feature (step 2066). The event processor 40 may then remove the identifier of the CPE 22 from the memory 30 (step 2068). Subsequently, if the event processor 40 receives a modem registration event from the CPE 22, the event processor 40 may determine that the identifier of the CPE 22 is not stored in the memory 30, and in response, inhibits sending a message to the policy controller 38 indicating that the CPE 22 needs to be re-provisioned with the differentiated feature.

Figure 4:
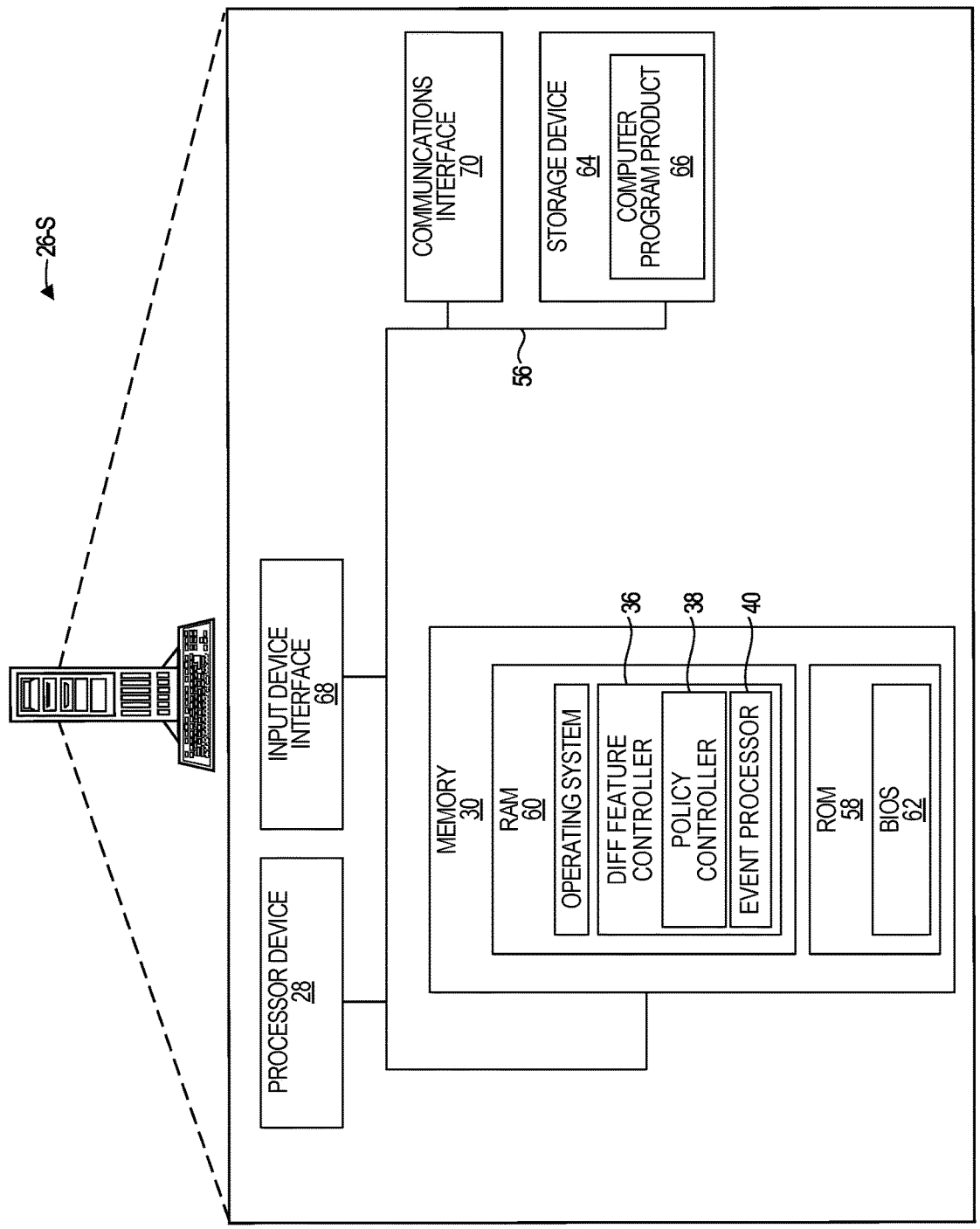
FIG. 4 is a block diagram of a computing device suitable for implementing the embodiments disclosed herein.

FIG. 4 is a block diagram of the computing device 26-S suitable for implementing the embodiments disclosed herein. The computing device 26-S may comprise any computing or electronic device capable of including firmware, hardware, and/or executing software instructions to implement the functionality described herein, such as a computer server, or the like. The computing device 26-S includes the processor device 28, the memory 30, and a system bus 56. The system bus 56 provides an interface for system components including, but not limited to, the memory 30 and the processor device 28. The processor device 28 can be any commercially available or proprietary processor.

The system bus 56 may be any of several types of bus structures that may further interconnect to a memory bus (with or without a memory controller), a peripheral bus, and/or a local bus using any of a variety of commercially available bus architectures. The memory 30 may include non-volatile memory 58 (e.g., read-only memory (ROM), erasable programmable read-only memory (EPROM), electrically erasable programmable read-only memory (EEPROM), etc.), and volatile memory 60 (e.g., random-access memory (RAM)). A basic input/output system (BIOS) 62 may be stored in the non-volatile memory 58 and can include the basic routines that help to transfer information between elements within the computing device 26-S. The volatile memory 60 may also include a high-speed RAM, such as static RAM, for caching data.

The computing device 26-S may further include or be coupled to a non-transitory computer-readable storage medium such as a storage device 64, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 64 and other drives associated with computer-readable media and computer-usable media may provide non-volatile storage of data, data structures, computer-executable instructions, and the like.

A number of modules can be stored in the storage device 64 and in the volatile memory 60, including an operating system and one or more program modules, such as the differentiated feature controller 36, which may implement the functionality described herein in whole or in part. All or a portion of the examples may be implemented as a computer program product 66 stored on a transitory or non-transitory computer-usable or computer-readable storage medium, such as the storage device 64, which includes complex programming instructions, such as complex computer-readable program code, to cause the processor device 28 to carry out the steps described herein. Thus, the computer-readable program code can comprise software instructions for implementing the functionality of the examples described herein when executed on the processor device 28. The processor device 28, in conjunction with the differentiated feature controller 36 in the volatile memory 60, may serve as a controller, or control system, for the computing device 26-S that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 28 through an input device interface 68 that is coupled to the system bus 56 but can be connected by other interfaces such as a parallel port, an Institute of Electrical and Electronic Engineers (IEEE) 1394 serial port, a Universal Serial Bus (USB) port, an IR interface, and the like. The computing device 26-S may also include a communications interface 70 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a computing system comprising one or more computing devices, that a customer premises equipment (CPE) that provides data access to a local area network has been dynamically provisioned with a differentiated feature that is different from default features identified in a boot configuration from which the CPE obtains features during a boot phase of the CPE, wherein the CPE communicates with an aggregation device that communicates with a plurality of CPE including the CPE;
   in response to determining that the CPE has been dynamically provisioned with the differentiated feature, storing, by the computing system, a first CPE identifier of the CPE in a memory;
   subsequent to storing the first CPE identifier in the memory, receiving, by the computing system, information that contains a second CPE identifier and that indicates that a CPE identified by the second CPE identifier has initiated a boot phase;
   determining that the second CPE identifier matches the first CPE identifier; and
   subsequent to the CPE initiating the boot phase and in response to determining that the second CPE identifier matches the first CPE identifier, causing, by the computing system, the CPE to be dynamically provisioned with the differentiated feature.

2. The method of claim 1 wherein the differentiated feature comprises a differentiated quality of service (QOS) feature.

3. The method of claim 2 wherein the QoS feature comprises one of a bandwidth feature, a device priority feature, and a traffic type priority feature.

4. The method of claim 1 wherein causing the CPE to be dynamically provisioned with the differentiated feature comprises sending an instruction to the aggregation device instructing the aggregation device to dynamically provision the CPE with the differentiated feature.

5. The method of claim 1 wherein the first CPE identifier comprises a media access control address of the CPE or an internet protocol address of the CPE.

6. The method of claim 1 wherein the CPE is a cable modem.

7. The method of claim 1 wherein the information that contains the second CPE identifier and that indicates that the CPE identified by the second CPE identifier has initiated the boot phase comprises a modem registration event that includes the second CPE identifier.

8. The method of claim 1 further comprising:
   determining, by the computing system, that the differentiated feature is to be removed from the CPE; and
   removing the first CPE identifier from the memory.

9. The method of claim 8 further comprising:
   subsequent to removing the first CPE identifier from the memory, receiving, by the computing system, information that contains a third CPE identifier that identifies the CPE and that indicates the CPE has initiated the boot phase;
   determining, by the computing system, that the third CPE identifier is not in the memory; and
   inhibiting causing the CPE to be dynamically provisioned with the differentiated feature.

10. The method of claim 1 wherein the aggregation device comprises a cable modem termination system and wherein the CPE comprises a modem that obtains the boot configuration via communications with the cable modem termination system.

11. The method of claim 1 wherein the aggregation device comprises a cable modem termination system and wherein the CPE is a modem that has a first connection to a router that implements the local area network and a second connection to the cable modem termination system.

12. A computing system comprising:
   one or more computing devices configured to:
      determine that a customer premises equipment (CPE) that provides data access to a local area network has been dynamically provisioned with a differentiated feature that is different from default features identified in a boot configuration from which the CPE obtains features during a boot phase of the CPE, wherein the CPE communicates with an aggregation device that communicates with a plurality of CPE including the CPE;

in response to determining that the CPE has been dynamically provisioned with the differentiated feature, store a first CPE identifier of the CPE in a memory;

subsequent to storing the first CPE identifier in the memory, receive information that contains a second CPE identifier and that indicates that a CPE identified by the second CPE identifier has initiated a boot phase;

determine that the second CPE identifier matches the first CPE identifier; and subsequent to the CPE initiating the boot phase and in response to determining that the second CPE identifier matches the first CPE identifier, cause the CPE to be dynamically provisioned with the differentiated feature.

13. The computing system of claim 12 wherein the differentiated feature comprises a differentiated quality of service (QOS) feature.

14. The computing system of claim 13 wherein the QoS feature comprises one of a bandwidth feature, a device priority feature, and a traffic type priority feature.

15. The computing system of claim 12 wherein, to cause the CPE to be dynamically provisioned with the differentiated feature, the one or more computing devices are further configured to send an instruction to the aggregation device instructing the aggregation device to dynamically provision the CPE with the differentiated feature.

16. The computing system of claim 12 wherein the CPE is a cable modem.

17. The computing system of claim 12 wherein the information that contains the second CPE identifier and that indicates that the CPE identified by the second CPE identifier has initiated the boot phase comprises a modem registration event that includes the second CPE identifier.

18. The computing system of claim 12 wherein the one or more computing devices are further configured to:

determine, by the computing system, that the differentiated feature is to be removed from the CPE; and remove the first CPE identifier from the memory.

19. The computing system of claim 18 wherein the one or more computing devices are further configured to:

subsequent to removing the first CPE identifier from the memory, receive, by the computing system, information that contains a third CPE identifier that identifies the CPE and that indicates the CPE has initiated the boot phase;

determine, by the computing system, that the third CPE identifier is not in the memory; and inhibit causing the CPE to be dynamically provisioned with the differentiated feature.

20. A non-transitory computer-readable storage medium that includes executable instructions to cause one or more processor devices to:

determine that a customer premises equipment (CPE) that provides data access to a local area network has been dynamically provisioned with a differentiated feature that is different from default features identified in a boot configuration from which the CPE obtains features during a boot phase of the CPE, wherein the CPE communicates with an aggregation device that communicates with a plurality of CPE including the CPE;

in response to determining that the CPE has been dynamically provisioned with the differentiated feature, store a first CPE identifier of the CPE in a memory;

subsequent to storing the first CPE identifier in the memory, receive information that contains a second CPE identifier and that indicates that a CPE identified by the second CPE identifier has initiated a boot phase;

determine that the second CPE identifier matches the first CPE identifier; and subsequent to the CPE initiating the boot phase and in response to determining that the second CPE identifier matches the first CPE identifier, cause the CPE to be dynamically provisioned with the differentiated feature.

* * * * *